United States Patent [19]
Cohen

[11] 3,854,218
[45] Dec. 17, 1974

[54] PLUMB BOB AND LEVEL

[75] Inventor: Harry Cohen, New York, N.Y.

[73] Assignee: The Raymond Lee Organization, New York, N.Y.; a part interest

[22] Filed: Apr. 14, 1972

[21] Appl. No.: 244,103

[52] U.S. Cl. .................................. 33/358, 33/392
[51] Int. Cl. ..................... G01c 15/10, G01c 9/32
[58] Field of Search ...................... 33/353, 392, 393

[56] References Cited
UNITED STATES PATENTS

| | | | |
|---|---|---|---|
| 1,626,130 | 4/1927 | Barth | 33/353 |
| 2,094,767 | 10/1937 | Coburn | 33/353 |
| 2,113,993 | 4/1938 | McLaughlin | 33/353 |
| 2,569,727 | 10/1951 | Mehaffey | 33/353 |
| 2,627,124 | 2/1953 | Rock | 33/392 |

*Primary Examiner*—William D. Martin, Jr.

[57] ABSTRACT

An improved plumb bob and level, suitable for outdoor use, which gives accurate indications despite the presence of wind gusts. A bubble level is located in the upper portion of the level which is visible from the side or from above. The incorporation of the bubble level unit enables the determination of the true vertical point under the position of support of the plumb bob line, despite the presence of wind gusts or other disturbances which keep the plumb bob in motion and prevent it from coming to the static rest position.

1 Claim, 4 Drawing Figures

PATENTED DEC 17 1974 3,854,218

PLUMB BOB AND LEVEL

SUMMARY OF THE INVENTION

This invention relates to an improved plumb bob which may be accurately read while the suspended plumb bob is maintained in pendulum motion by wind or vibration.

The advantage of this invention is that the improved plumb bob may be utilized outdoors under conditions which make the reading of conventional instruments fraught with error.

Under conditions or wind gusts, or support vibration, a suspended plumb bob tends to move as a pendulum, so that it becomes very difficult for an observer to accurately locate the true vertical spot below the support position of the plumb line.

With this invention, the plumb bob is held slightly away from the true vertical position, and released to scribe or indicate a line, the bob having been held with the bubble indicating the level condition, said level being located at right angles to the line being scribed. The operation is repeated to scribe or indicate a line at right angles to the first line, with the true vertical spot being the intersection of the several scribed or indicated lines of motion of the bob. In this manner, the plumb bob of this invention may be used when wind or other conditions would preclude accurate readings with a conventional plumb bob.

A bubble level tube is installed in the plumb bob so as to read the horizontal position, when the bob rests in true vertical orientation. The level is located in the upper section of the bob, so that it may be seen from above, or from either side.

BRIEF DESCRIPTION OF THE DRAWING

The objects and features of the invention may be understood with reference to the following detailed description of an illustrative embodiment of the invention, taken together with the accompanying drawing in which.

DESCRIPTION OF THE PREFERRED EMBODIMENT

Figure 1:
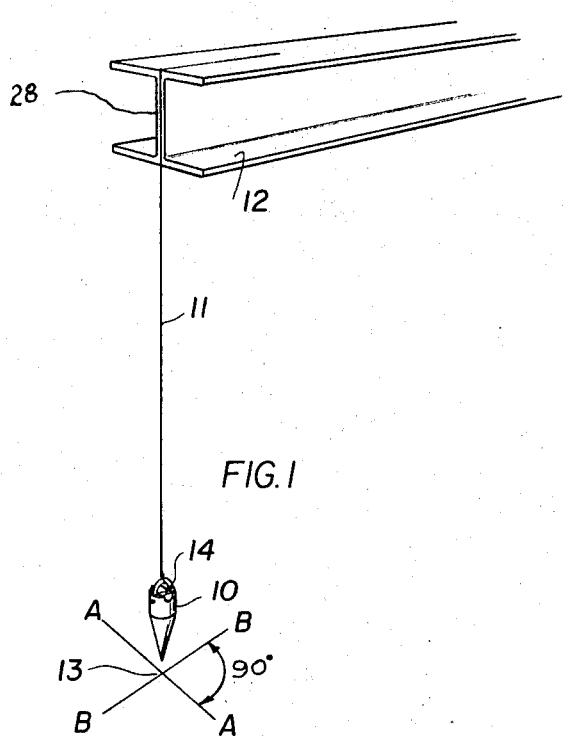
FIG. 1 is a perspective view of the plumb bob in use.

Turning now descriptively to the drawing, in which similar reference characters denote similar elements throughout the several views, FIG. 1 illustrates the device 10 hung from line 11 fastened from the end of girder 12. The true vertical spot 13, below the point of support 28 is found by scribing perpendicular lines A—A and B—B, with the intersection 13 of the lines representing the true vertical position.

In scribing lines A—A and B—B, the plumb bob 10 is held and then released with the longitudinal axis of the level 14 at a right angle to the line being scribed.

Figure 2:
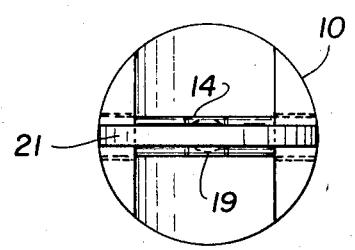
FIG. 2 is a top plan view of the improved plumb bob.
Figure 3:
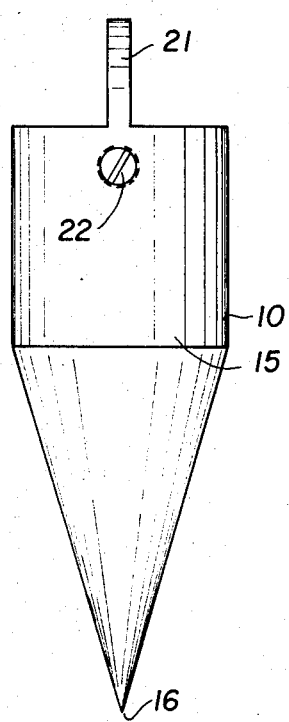
FIG. 3 is a front view of the improved plumb bob.
Figure 4:
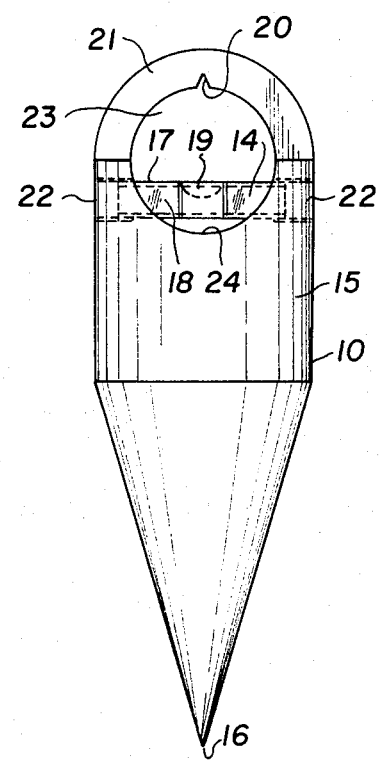
FIG. 4 is a side view of the improved plumb bob.

The device 10 as shown in FIGS. 2-4 consists of a metal circular body 15 which comes to a point 16 at its lower end, with a circular handle 21 mounted above the plumb body 15, said plumb body 15 having a concave recessed top 24. The level 14 is formed of a hollow transparent tube 17 preferably of an acrylic plastic, in which a colored liquid 18 and a bubble of air 19 is sealed.

Level 14 is installed in the upper section of the bob body 15 at right angles to the axis of the circular opening 23 formed by the handle 21 and the concave top section 24, and set so that the bubble 19 rests in the middle position of the tube 17 when the bob body 15 is vertically centered above the bob point 16. The level 14 is held in place by end screws 22, the removal of which permit replacement of a damaged level. In the installed position, the bubble may be observed from above the bob or from a side position. A notch 20 in the lower surface of handle 21 serves to locate the proper attachment point for the plumb line 11.

Since obvious changes may be made in the specific embodiment of the invention described herein, it is indicated that all matter contained herein is intended as illustrative and not as limiting in scope.

Having thus described my invention, what I claim as new and desire to secure by Letters Patent of the United States is:

1. An improved plumb bob for obtaining accurate determinations of the true vertical point under the point of support of the attached plumb line under conditions which prevent the plumb bob from coming to a static rest position, consisting of a plumb bob body with means to attach a line directly above the vertical axis of said body, said body being pointed at its nethermost point on said axis, with a level indicating device incorporated in said plumb bob body visible from the side or from above the body when suspended by the attached line, said level indicating device indicating the level position when the suspended plumb bob body is at the static rest position, in which the level indicating device consists of a sealed tube containing a liquid and a bubble of air, said tube of the level indicating device being mounted in the upper portion of the plumb bob body, with the longitudinal axis of the tube being perpendicular to the vertical axis of the suspended plumb bob body, with a handle of circular shape fastened to the upper surface of the body so as to project above the upper surface of the plumb bob body, the undersurface of said handle being notched at its central point directly above the center of gravity of the plumb bob body in the suspended state, with the level indicating device installed parallel to the axis of said handle, so that a flexible line may be attached to the plumb bob handle by being looped through the notch of the handle, said notch attachment point ensuring that the level indicating device will indicate the level position when the plumb body is suspended from the attached flexible line in the static position.

* * * * *